US008908221B2

(12) United States Patent
Buzuev et al.

(10) Patent No.: US 8,908,221 B2
(45) Date of Patent: Dec. 9, 2014

(54) TAPE PRINTING APPARATUS

(75) Inventors: Vladimir Buzuev, Castro Valley, CA (US); Jimmy Dullaert, Stekene (BE)

(73) Assignee: Sanford, L.P., Downers Grove, IL (US)

( * ) Notice: Subject to any disclaimer, the term of this patent is extended or adjusted under 35 U.S.C. 154(b) by 0 days.

(21) Appl. No.: 13/339,582

(22) Filed: Dec. 29, 2011

(65) Prior Publication Data

US 2012/0099912 A1 Apr. 26, 2012

Related U.S. Application Data

(62) Division of application No. 11/697,213, filed on Apr. 5, 2007, now Pat. No. 8,092,104.

(51) Int. Cl.

*G06K 15/00* (2006.01)
*B41J 3/46* (2006.01)
*B41J 3/407* (2006.01)

(52) U.S. Cl.

CPC . *B41J 3/4075* (2013.01); *B41J 3/46* (2013.01)
USPC .......................................... 358/1.16; 358/1.15

(58) Field of Classification Search

CPC ..................... G06K 15/024; G06K 2017/0083
USPC .......................................................... 358/1.16
See application file for complete search history.

(56) References Cited

U.S. PATENT DOCUMENTS 5,584,591 A 12/1996 Mori et al.
6,379,058 B1 * 4/2002 Petteruti et al. ................. 400/76
7,126,716 B1 * 10/2006 Kaufman et al. ............ 358/1.18
2004/0094632 A1 * 5/2004 Alleshouse .................. 235/494
2004/0205208 A1 10/2004 Koponen et al.
2004/0265027 A1 * 12/2004 Hine et al. ...................... 400/76
2005/0057761 A1 * 3/2005 Sakai et al. .................... 358/1.2
2006/0071063 A1 4/2006 Duckett
2006/0138227 A1 6/2006 Alleshouse
2006/0227372 A1 10/2006 Takayanagi
2007/0016924 A1 * 1/2007 Ishida et al. .................... 725/38
2007/0134041 A1 * 6/2007 Uchiyama et al. .............. 400/62
2007/0192453 A1 8/2007 Copeland et al.
2007/0276740 A1 11/2007 Hunter et al.
2008/0074697 A1 * 3/2008 Sawada et al. ............... 358/1.15
2008/0144083 A1 6/2008 Powers et al.
2008/0147913 A1 * 6/2008 Miguel et al. ................... 710/48
2008/0247798 A1 10/2008 Buzuev et al.
2009/0016795 A1 1/2009 Caveney et al.
2010/0328714 A1 * 12/2010 Allen et al. .................. 358/1.15

FOREIGN PATENT DOCUMENTS

EP 0 267 890 A2 5/1988
EP 0 322 918 A2 7/1989
EP 0 578 372 A2 1/1994
EP 0 885 733 A2 12/1998

(Continued)

OTHER PUBLICATIONS

Invitation to Pay Additional Fees and, Where Applicable , Protest Fees (along with Partial International Search, mailed Aug. 14, 2008 (5 pages).

(Continued)

*Primary Examiner* — Benjamin O Dulaney
(74) *Attorney, Agent, or Firm* — Marshall, Gerstein & Borun LLP

(57) ABSTRACT

A tape printing apparatus, comprising a port for connecting to external apparatus; a first memory for storing label data defining at least one label; and a second memory comprising program information.

7 Claims, 14 Drawing Sheets

(56) References Cited

FOREIGN PATENT DOCUMENTS

| | | | |
|---|---|---|---|
| EP | 1 580 009 | A1 | 9/2005 |
| EP | 1 582 365 | A1 | 10/2005 |
| EP | 1 719 632 | A1 | 11/2006 |
| JP | 07-050630 | A | 2/1995 |
| JP | 07-186455 | A | 7/1995 |
| JP | 08-129462 | A | 5/1996 |
| JP | 11-161441 | A | 6/1999 |
| JP | 2002-160419 | A | 6/2002 |
| JP | 2003-177890 | A | 6/2003 |
| JP | 2005078128 | A | 3/2005 |
| JP | 2007-034364 | A | 2/2007 |
| JP | 2007038588 | A | 2/2007 |
| WO | WO-93/10506 | | 5/1993 |

OTHER PUBLICATIONS

International Search Report and Written Opinion for Application No. PCT/EP2008/054178, dated Apr. 12, 2008.

Notice of Reasons for Rejection for Japanese Application No. 2010-501533, mailed Sep. 6, 2011.

Decision of Rejection for Japanese Application No. 2010-501533, mailed Feb. 19, 2013.

* cited by examiner

TAPE PRINTING APPARATUS

REFERENCE TO RELATED APPLICATIONS

This is a Divisional under 35 USC §120 of U.S. patent application Ser. No. 11/697,213, filed Apr. 5, 2007, and issued as U.S. Pat. No. 8,092,104, the entirety of which is incorporated herein by reference.

FIELD OF THE DISCLOSURE

The present invention relates to a tape printing apparatus.

BACKGROUND

Tape printing apparatus are known in for example EP-A-322918 (Brother Kogyo Kabushiki Kaisha) and EP-A-267890 (Varitronics). The known tape printing apparatus comprise a cassette receiving bay for receiving a cassette or tape holding case. In EP-A-267890, the tape holding case houses an ink ribbon and a substrate tape, the latter comprising an upper image receiving layer secured to a backing layer by an adhesive. In EP-A-322918, the tape holding case houses an ink ribbon, a transparent image receiving tape and a double-sided adhesive tape which is secured at one of its adhesive coated sides to the image tape after printing and which has a backing layer peelable from its other adhesive coated side. With this tape printing apparatus, the image transfer medium (ink ribbon) and the image receiving tape (substrate) are in the same cassette.

It has also been proposed by the present applicant in, for example EP-A-578372 to house the ink ribbon and the substrate tape in separate cassettes.

In all of these cases, the image receiving tape passes in overlap with an ink ribbon to a printing zone consisting of a print head and a platen which cooperate to cause an image to transfer from the ink ribbon to the image receiving tape. There are many ways in doing this, including dry lettering or dry film impression but the most usual way currently is by thermal printing where the print head is heated and the heat causes ink from the ink ribbon to be transferred to the image receiving tape.

It is also known for the ink ribbon to be omitted and an image to be printed directly on the image receiving tape by heating the print head. This process is called direct thermal printing.

It is known for tape printing apparatus to be connected to a personal computer or PC. With this known arrangement, the user interacts with the PC to design labels. The user interacts with the PC in order to control the printing of labels by the label printer.

Designing labels on a PC is often easier than designing labels on a label printer. This is because the display connected to a PC is very much larger than the display of a label printer. Additionally, the keyboard and mouse arrangement associated with a PC is generally easier to use than the smaller keyboard of a label printer. Accordingly, it is known to design labels on a PC and to download the labels onto a memory card which can then be inserted into a suitable slot in a label printer.

However, the downloading of labels onto a memory card requires the PC to have a suitable memory card slot. Additionally, it is easy for the memory card to be lost or damaged.

It is an aim of some embodiments of the present invention to address or at least mitigate one or more of the problems set out above.

STATEMENT OF INVENTION

According to one aspect of the present invention, there is provided a tape printing apparatus, comprising a port for connecting to external apparatus; a first memory for storing label data defining at least one label; and a second memory comprising program information.

According to further aspect of the present invention, there is provided a system comprising a tape printing apparatus having a memory, said memory have stored therein data; a computer; a connection between said PC and said tape printing apparatus, wherein said PC is arranged to receive from said tape printing apparatus said data, to modify said data and to send said modified data to said tape printing apparatus, said modified data being stored in said memory.

According to another aspect of the present invention, there is provided a method comprising receiving from a tape printing apparatus data stored in a memory of said tape printing apparatus; modifying said data; sending said modified data to said tape printing apparatus to be stored in said memory.

According to another aspect of the present invention, there is provided a method comprising providing a first mode of operation in which a labels is designed on a PC using attributes available on said PC; and providing a second mode of operation in which labels is designed on said PC using only attributes available on a tape printing apparatus.

According to another aspect of the present invention, there is provided an apparatus comprising a processor arranged to determine if a label satisfies a predetermined criteria and if so to modify said label to provide a template.

According to another aspect of the present invention, there is provided a tape printing apparatus, comprising a port for connecting to external apparatus; a memory; said tape printing apparatus arranged to have a first mode in which data received at said port is printed and a second mode in which data received at said port is saved to said memory.

DETAILED DESCRIPTION OF THE PREFERRED EMBODIMENTS

Figure 1:
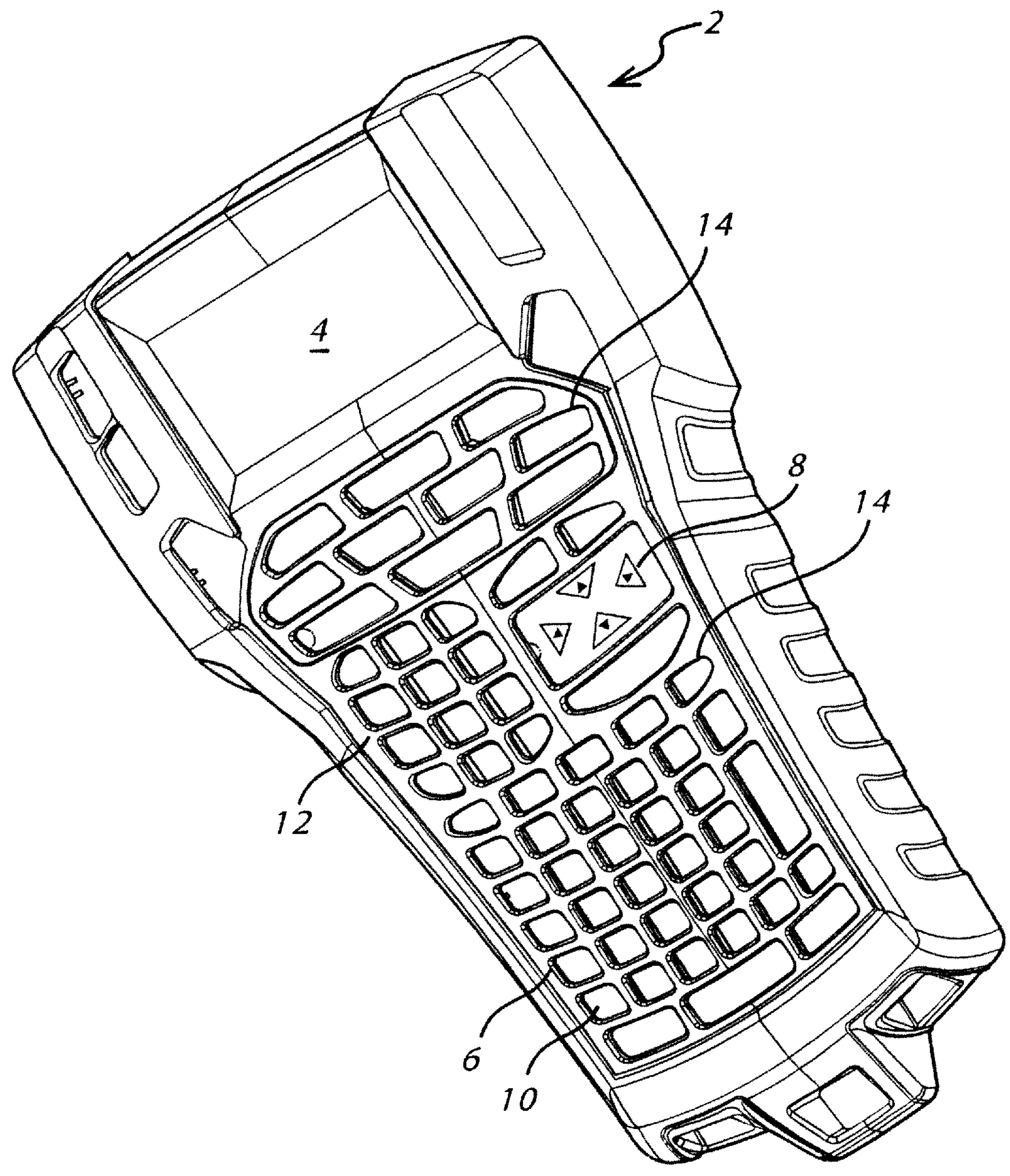
FIG. 1 shows a tape printing apparatus embodying the present invention.

FIG. 1 shows the front of a tape printing apparatus 2. The printing apparatus has a display 4. In preferred embodiments of the present invention, the display 4 is a liquid crystal display. The tape printing apparatus has a keyboard 6. The keyboard 6 has a plurality (in this case four) cursor control keys 8. Also provided are a plurality of keys 10 for selecting characters and a plurality of keys 12 for selecting numbers. The keyboard 6 also has two sets of function keys 14. It should be appreciated that the number of keys provided and the functions provided by those keys can be varied in accordance with the application of the printer. For example, in one embodiment the individual keys for the numbers can be omitted and instead the number keys may be accessed via character keys. Another modification avoids the requirement for a single key for each character. Alternatively, functions may be accessed by use for example of a shift key.

The keyboard 6 thus allows the user to input an image including characters, number and/or symbols. The function keys allow the attribute of the labels to be selected. The function keys 14 thus allow different functions to be implemented and may control the operational mode of the tape printing apparatus.

In one alternative embodiment of the present invention, the keyboard can be replaced by a touch-pad, a touch-screen or any other input means.

Figure 3:
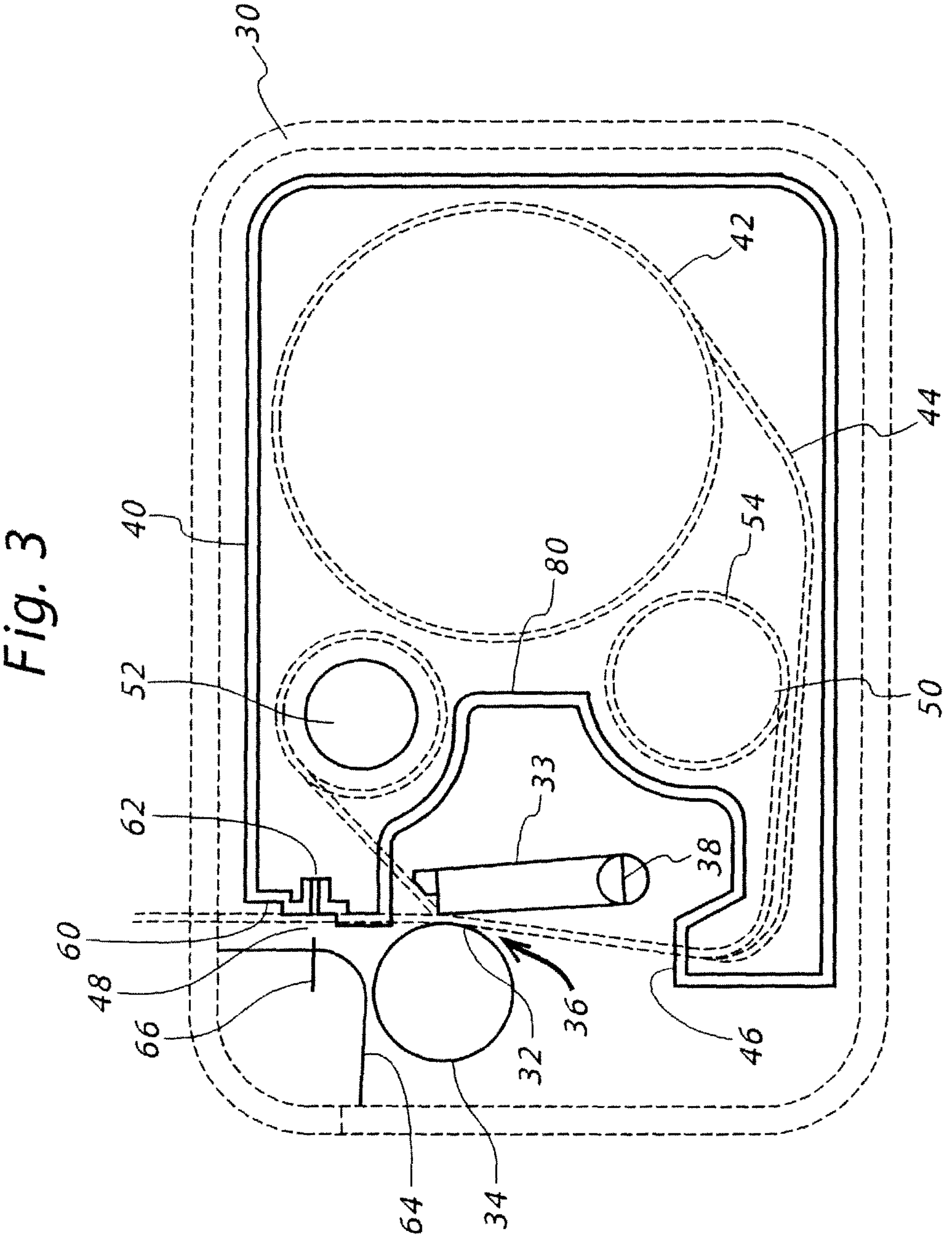
FIG. 3 diagrammatically shows a cassette in the cassette receiving bay of the tape printing apparatus of FIG. 1.

Reference is made to FIG. 3 which shows a cassette receiving bay which is indicated by the dotted line 30. The cassette bay 30 includes a thermal print head 32 and a rotatable platen 34 which cooperate to define a print zone 36. The cassette receiving bay is accessed via the rear side of the printing apparatus.

The thermal print head 32 comprises a column of printing elements. The print head 32 has a height which is generally large enough to print on the widest width of tape. The print head 32 has a one printing element in each row of the column. Each of the printing elements is separately addressed and is activated in accordance with the desired image to be printed. An image can be printed with the width of characters extending along the tape or with the height of the characters extending along the length of tape in the so-called vertical printing mode.

The print head arm 33 which holds the print head holder and the print head 32 itself can pivot about a pivot point 38 to enable the cassette to be removed and replaced in the cassette bay. A cassette inserted in the cassette bay 30 is noted generally by reference number 40. The cassette 40 holds a supply spool 42 of an image receiving tape 44. The image receiving tape 44 is guided by a guide mechanism (not shown) through the cassette 40, out of the cassette 40 through an outlet 46, past the print zone 36 to a cutting location 48.

The same cassette 40 has an ink ribbon supply spool 50 and an ink tape up spool 52. The ink ribbon 54 is guided from the ink ribbon supply spool 50 through the print zone 36 and taken up on the ink ribbon tape up spool 52. The image receiving tape 44 thus passes in overlap with the ink ribbon 54 through the print zone 36 with its image receiving layer in contact with the ink ribbon 54.

The cassette 44 has a recess 80 for receiving the print head 32. Guide portions may also be provided (not shown) for guiding the thermal transfer ribbon 54 through the print zone 36. The print head 32 is movable between an operative position in which it is in contact with the platen 34 and holds the thermal transfer ribbon 54 and the image receiving tape 44 in overlap between the print head 32 and the platen 34 and an inoperative position in which it is moved away from the platen 34 to release the ink ribbon 54 and the image receiving tape 44. In the operative position, the platen 34 is rotated to cause the image receiving tape 44 to be driven passed the print head 32 and the print head is controlled to print an image on the image receiving tape 44 by the thermal transfer of ink from the ink ribbon 54.

Figure 2:
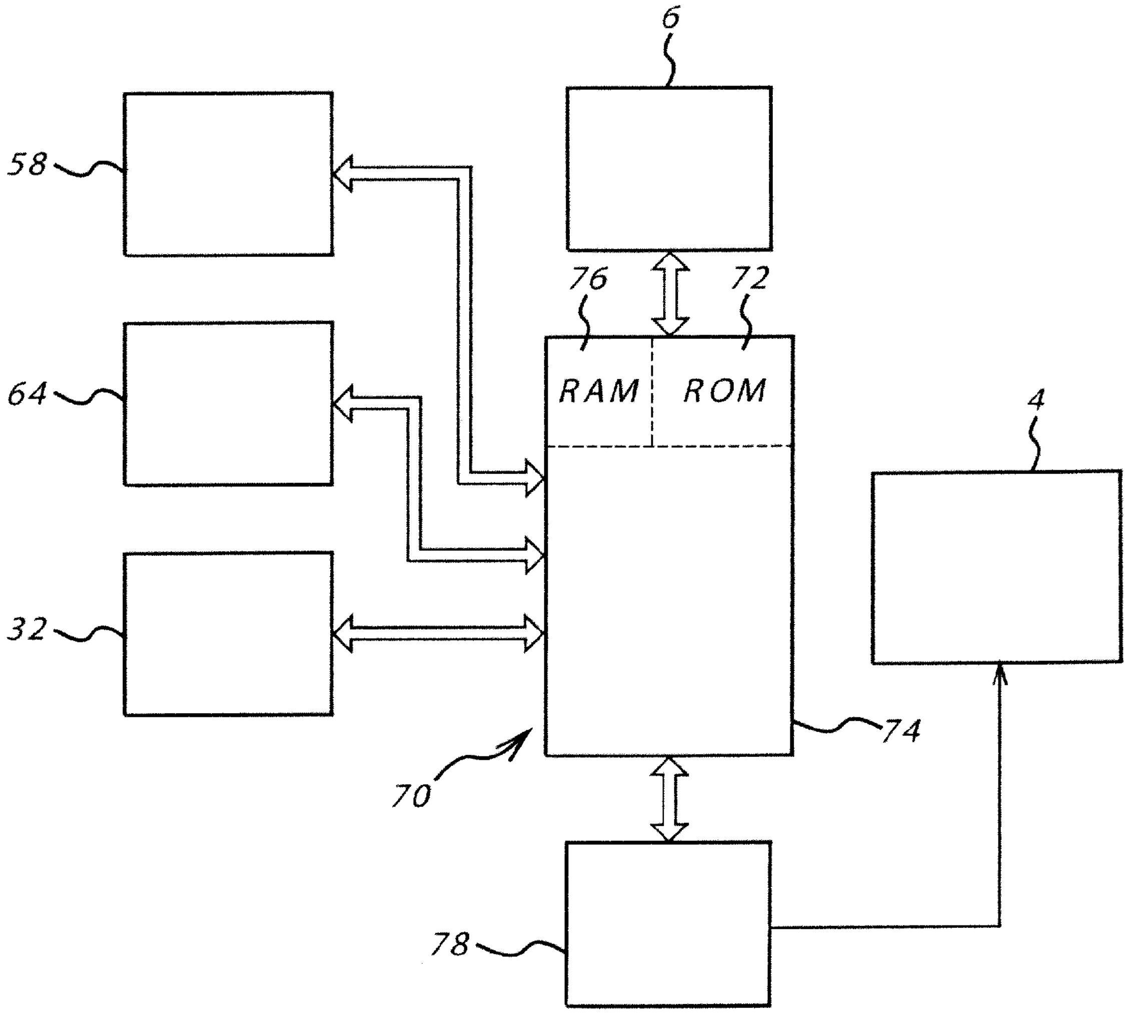
FIG. 2 shows control circuitry for controlling the tape printing apparatus embodying the present invention.

As shown diagrammatically in FIG. 2, the platen is driven by a motor 58. The motor rotates to drive the image receiving tape through the print zone 36 continuously during printing. It is possible that the tape may be driven in a step wise manner by a stepper motor.

An image is printed on the tape fed out from the print zone 36 to the cutting location 48 which is provided at a location in a portion of the wall of the cassette 40 which is close to the print zone 36. The portion of the wall on the cassette 40 where the cutting location 48 is defined is denoted by reference number 60. A slot 62 is defined in the wall portion 60 of the cassette and the image receiving tape 44 is fed past the print zone 36 to the cutting location 48 where it is supported by facing portions on either side of the slot 62.

A cutting mechanism 64 including a cutting blade 66 is provided. The cutting blade 66 cuts the image receiving tape 44 and then enters the slot 62.

Basic circuitry for controlling the tape printing apparatus is shown in FIG. 2. There is a microprocessor chip 70 having a non volatile memory 72, a microprocessor 74 and random access memory RAM capacity indicated diagrammatically by RAM 76. The microprocessor chip 70 is connected to receive label data input from a data input device such as keyboard 6. One embodiment of the memory structure for the label printing apparatus will be described later with reference to FIG. 4.

The microprocessor chip 70 outputs data to drive display 4 via a display driver chip 78 to display a label to be printed (or part thereof) and/or other information such as a message for the user. The display driver alternatively may form part of the microprocessor chip. Additionally, the microprocessor chip 70 also outputs data to drive the print head 32 so that the label data is printed on the image receiving tape to form a label. Finally, the microprocessor chip also controls the motor 58 for driving the platen 34. The microprocessor chip may also control the cutting mechanism 64 to allow a length of tape to be cut off. In alternative embodiments of the present invention, at least part of the cutting mechanism may be manually operated.

Figure 4:
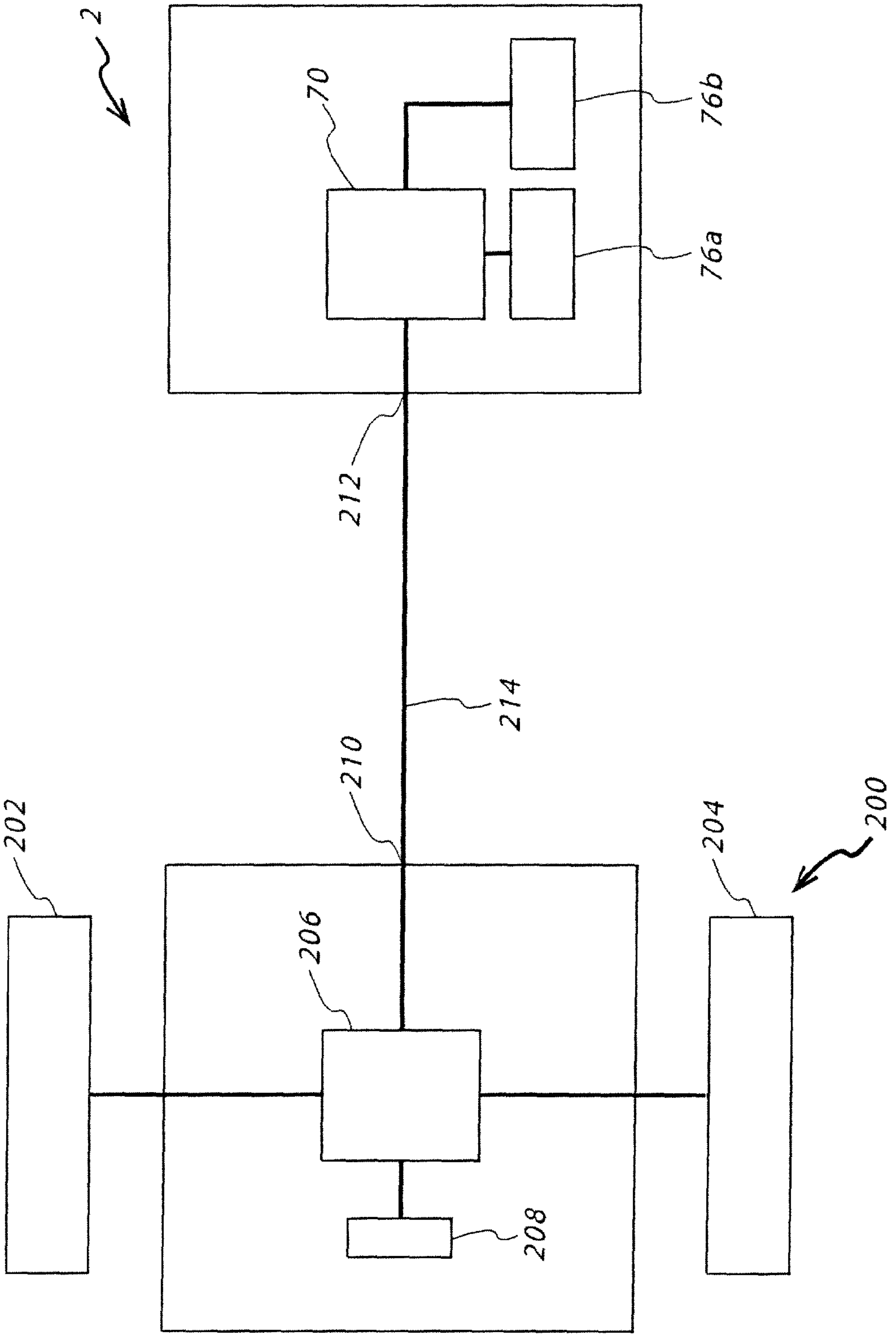
FIG. 4 shows schematically the tape printing apparatus of FIG. 1 connected to a PC.

Reference is now made to FIG. 4 which shows a PC (personal computer) 200 connected to the tape printing apparatus 2. This PC comprises a display 202 and an input device 204. Usually, the input device 204 may comprise a keyboard and/or a mouse. However, it should be appreciated that the input device can take any suitable form. For example, the display may be a touch-sensitive display and input is by that touch-sensitive display. The PC 200 has a microprocessor 206 and memory indicated diagrammatically by 208. This memory may comprise any suitable type of memory and for example may be random access memory or the like. Alternatively or additionally, the microprocessor 206 may comprise memory capacity.

The PC 200 has a USB (Universal Serial Bus) port 210. Likewise, the tape printing apparatus 2 also has a USB port 212. A cable 214 is used to connect the PC 200 and the tape printing apparatus via the USB ports.

It should be appreciated that any other suitable mechanism can be used to connect the tape printing apparatus to the PC. For example, the connection may be via a wireless connection, for example a Bluetooth connection. Alternatively, the connection between the PC and the tape printing apparatus may be via a wired connection which operates in accordance with a protocol different to that of the USB protocol.

The tape printing apparatus 2 comprises a controller 70, a first flash memory 76*a* and a second flash memory 76*b*. The first flash memory 76*a* is arranged to store labels, templates, text strings and the like. The second flash memory 76*b* is arranged to store programming and fonts. The first flash memory 76*a* contents are downloaded to the PC 200 as will be described in more detail hereinafter. The first and second flash memories are separate memories. In this embodiment, the microcontroller may not have memory capacity or only a limited memory capacity. Alternatively, the microcontroller may have memory which is not used or is used for data not stored in the flash memories.

Preferred embodiments of the present invention use flash memories. However alternative embodiments of the invention may use other types of memory instead of the flash memory for the first and/or second memories.

The PC 200 is arranged to receive data from the tape printing apparatus 2 via the USB port 210. The microprocessor 206 will interpret the data received via the USB connection. Likewise, the processor is arranged to format data to be sent via the USB port 210 to the tape printing apparatus into a format in accordance with the USB protocol. The microprocessor 70 performs a similar function to that of the microprocessor 204 of the PC.

The PC is arranged to have stored thereon software which allows the PC when connected to the tape printing apparatus to be operated in two modes. These two modes are referred to as the printer mode and the device mode.

The printer mode will now be described in relation to FIG. 5. In the printer mode, using the PC, it is possible to design and print labels directly to the tape printing apparatus, via the USB connection. To a certain extent, the tape printing apparatus acts as a dumb printer and prints the image that is downloaded to it from the PC.

Figure 5:
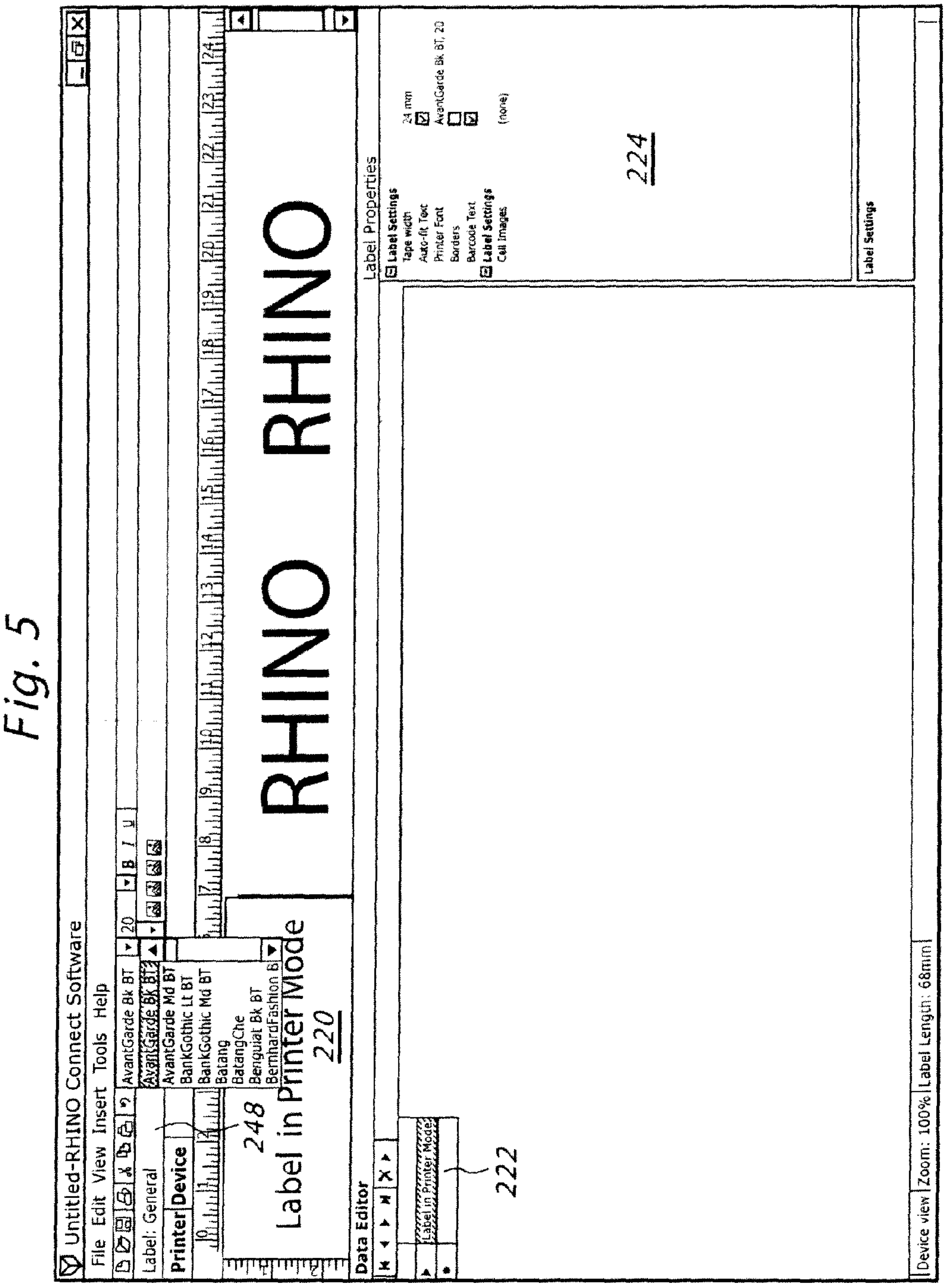
FIG. 5 shows an image displayed by the display of the PC when the printer mode is selected.

FIG. 5 shows the image displayed when the tape printing apparatus is in the printer mode. The image displayed by the display of the PC has three different areas. The first area 220 is the label preview area. This shows what the currently selected label will look like when printed. A second area is the data editor area 222 which provides a data grid. It is in this area that the user enters data and/or edits the images of one or more labels.

The third area 224 shows the properties that can be set for the selected label type and also the actual values that have been selected. For example, with the label which has been selected, the options which the user needs to set are tape width, autofit text, font, borders, and barcode text. As can be seen, these options fall into two categories. There are those options for which specific value needs to be set. For example, tape width has a plurality of different values. In this example, the tape width has been set to 24 mm. Likewise, font has a number of different options both for the style of font as well as the size of font. The selected font and font size are displayed.

Other of the options can be set or not set. For example, autofit text is either selected or not. This is indicated by one type of mark if this option is selected and a different type of mark if this option is not selected. In this particular embodiment, a selected option is marked with a tick and an option which is not selected is shown with an empty box. It should be appreciated that these label settings are by way of example only and the manner in which it is indicated whether an option is selected or not can be varied.

It should be appreciated that these three areas are used in both the device mode and the printer mode as will be discussed in more detail hereinafter.

In the printer mode, the available font and font sizes are those of the PC. Thus, any font which is available on the PC can be used in the printer mode.

Reference is now made to FIGS. 6 to 13 which show various images displayed by the PC when the device mode is selected. In summary, the device mode is used to design labels that can be transferred to the tape printing device. In the device mode, the formatting features available are limited to those features which are available in the tape printing apparatus. When in the device mode, it is possible to synchronise data stored in the PC with data stored on the tape printing apparatus and vice-versa. For example, it is possible to upload labels, symbols or strings of text from the tape printing apparatus. One or more of the uploaded data items can be changed and the changes can be downloaded to memory. Labels, symbols and/or strings of text can be downloaded to the tape printing apparatus from the PC.

Figure 6:
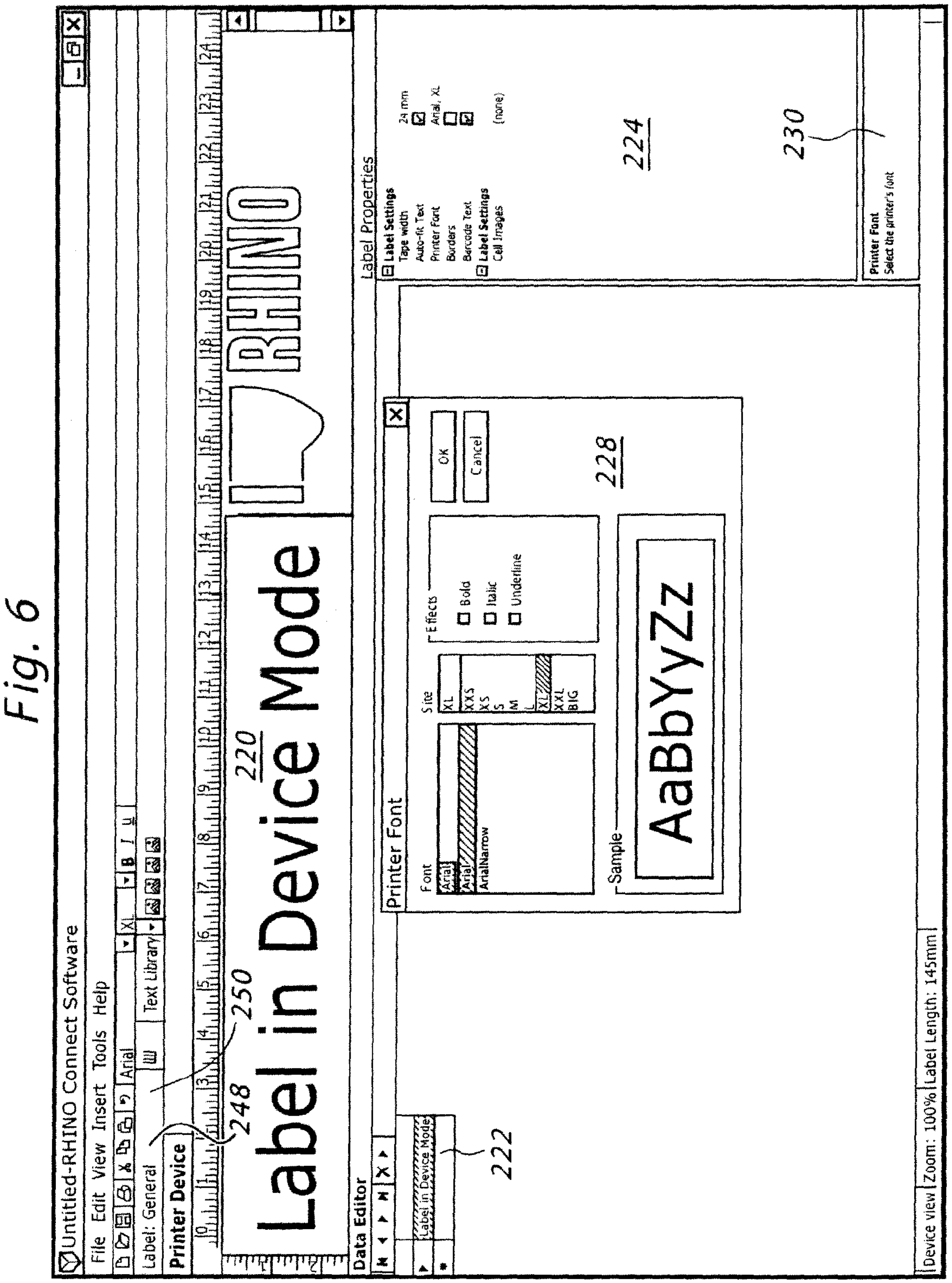
FIG. 6 shows an image displayed by the display of the PC when the device mode is selected.

Reference is first made to FIG. 6 which shows the image displayed by the PC when the device mode is selected. As with the printer mode, there are the three areas that is the label preview area, the data editor area 222 and label properties area 224. In addition, in the image shown in FIG. 6 a print font menu 228 is displayed. The available fonts correspond to those fonts which are available in the tape printing apparatus. Likewise, the available sizes of those fonts are those which are available in the tape printing apparatus. As can be seen by contrasting FIG. 5 and FIG. 6, in the printer mode, the point size is used to define the character size. In contrast, in the device mode, the character size is defined as being XXS XS, S, M, L, XL, XXL and BIG, which are the font sizes used in the tape printing apparatus. The available effect again will be those effects which are available in the tape printing apparatus.

There is also an area 230 in the display which provides some information for the user. In the example shown in FIG. 6, the user is instructed to set the font.

Figure 7:
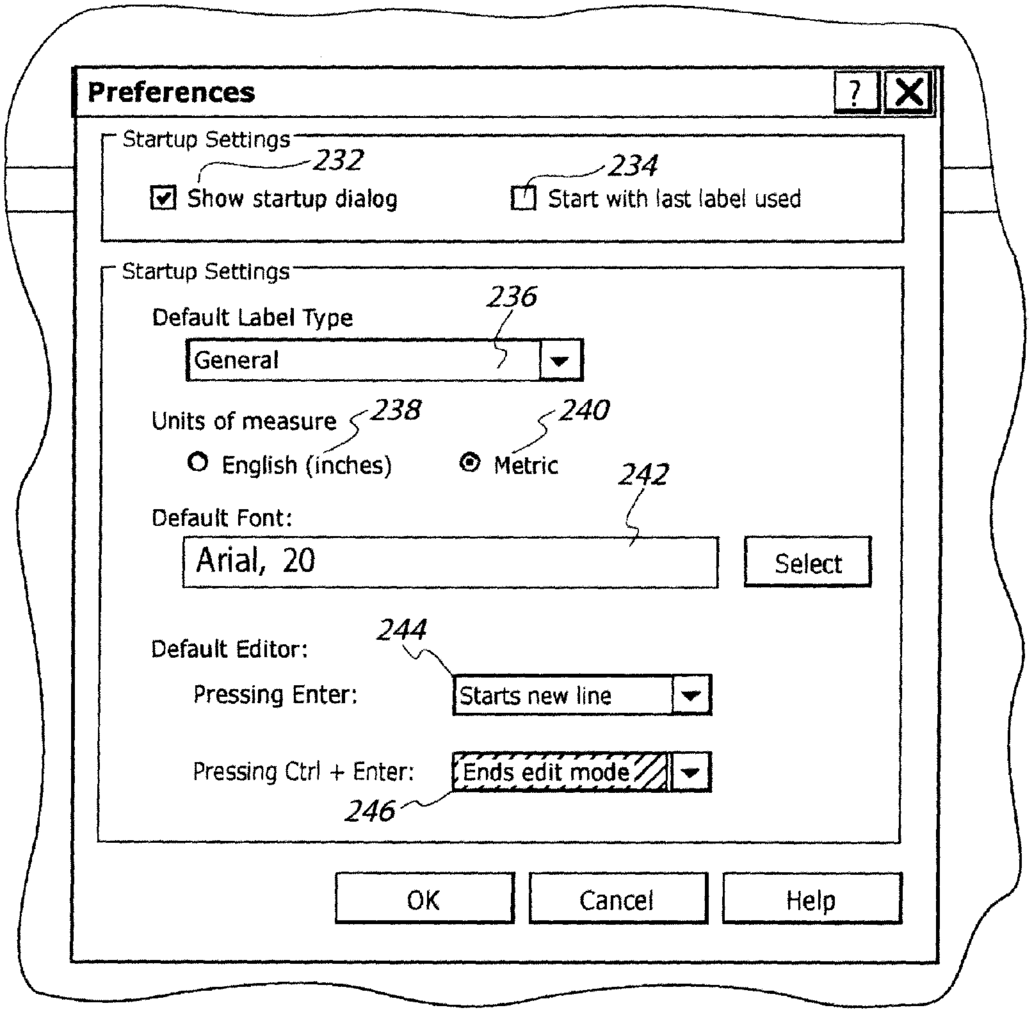
FIG. 7 shows a preference menu displayed by the display of the PC.

FIG. 7 shows a display which allows the user to make choices about certain features in the software based on the user's personal preferences. For example, the user is able to select by ticking box 232 whether to show the start-up dialog. When this option is selected, this will display a wizard for creating new labels every time the software is selected. If this option is not selected, then the alternative of starting with the last label used is selected. When this alternative option is selected by ticking box 234, the software will open with last label which was worked on when the software was previously selected. The show start-up dialog and start with last label used are alternatives and cannot be selected together.

The user is also able to select the default label type by selecting the preferred default option in box 236. This effectively selects the default label type to be used by default every time the software is started.

The user is able to select their default unit of measurement. Thus, the user is able to select either the metric option or the imperial (i.e. inches etc.) option by marking area 238 or 240 respectively.

The user is able to select the default font in area 242 of the display. In one embodiment, there is a single default font. In other alternative embodiments of the present invention, the default font may be set differently depending on whether the printer mode is selected or whether the device mode is selected.

Additionally, the user is able to control the action caused by activating just the enter key and the control and enter keys together. In the example shown in FIG. 7, pressing just enter will cause a new line to be selected as referenced 244. Pressing control and enter together will end the edit mode as referenced by 246. It should be appreciated that choosing one of these options will automatically set the other option. In the alternative, pressing enter may end the edit mode whilst pressing control plus enter will start a new line.

It should be appreciated that the various settings shown in the preferences menu are by way of example only. In alternative embodiments of the present invention, other preferences may be available. These may be additional to or as an alternative to those options shown in FIG. 7. It should appreciated that the way in which a particular option is selected can be achieved by any suitable manner.

Figure 8:
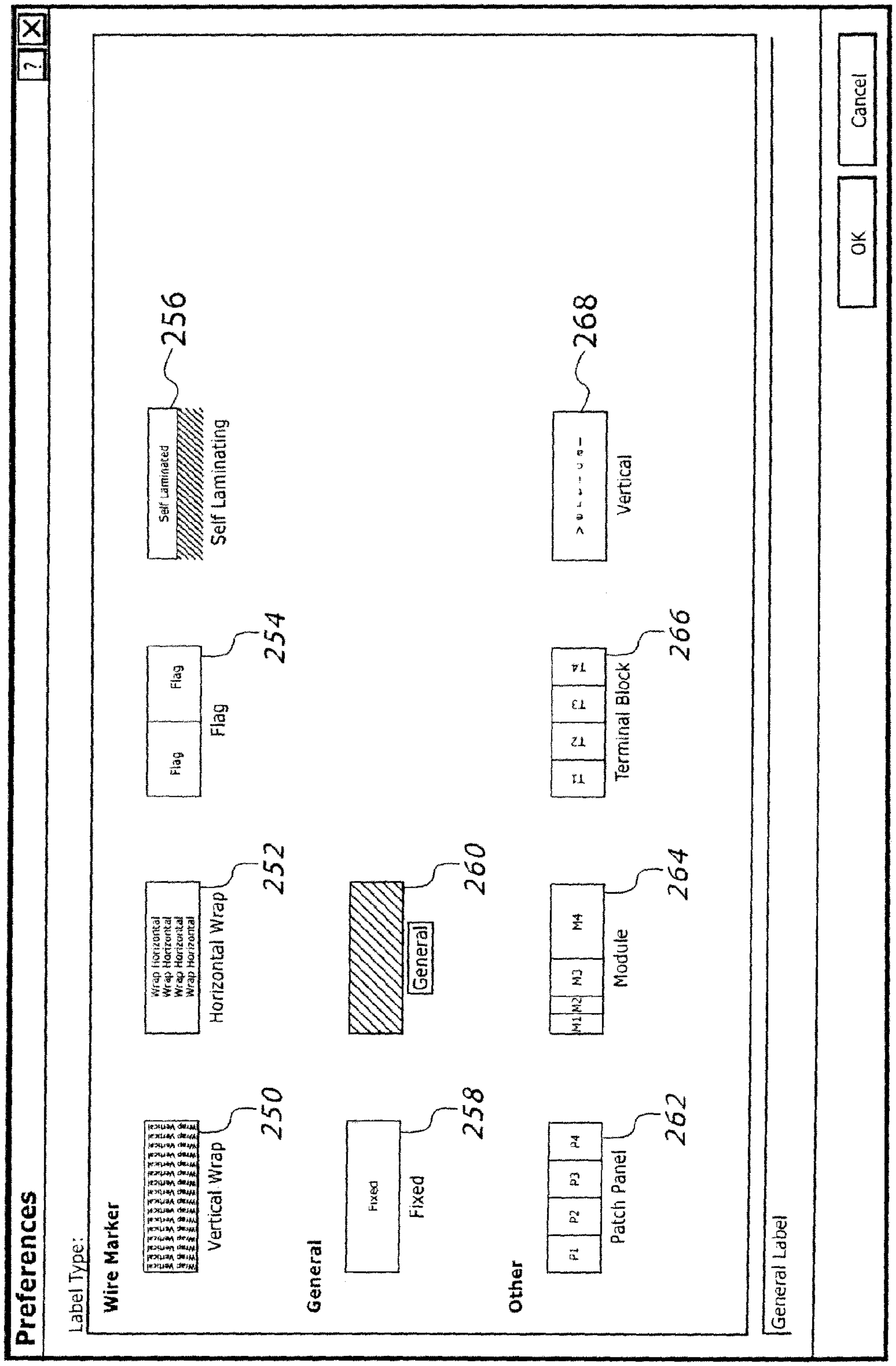
FIG. 8 shows the available label format options displayed by the display of the PC.

Reference is made to FIG. 8 which shows the various label types which are selectable. The image which is displayed by the PC, and illustrated in FIG. 8 is shown when the option of change label type is selected from the file menu. It should be appreciated that, as illustrated both in FIGS. 5 and 6, there is an area 248 next to the tag "label". This displays the currently selected label type. However, there is a drop-down menu which can be activated by clicking on the arrow 250 which will display the various label types shown in FIG. 8 in a slightly different format.

In this embodiment, the following label types are available: vertical wrap, horizontal wrap, flag, self-laminating. These are all modes for labelling wires. In the vertical wrap mode, the image is printed repeatedly across the width of the tape. The tape can then be wound round a wire. The horizontal wrap mode is similar except the image is printed repeatedly along the length of the tape. With the flag mode, the cable is accommodated in the label with the ends for example, of the label being stuck together to form a so-called flag. In the self-laminating mode, an image is printing across part of the tape. Another part of the tape is then wrapped around to cover the surface on which the image has been printed to thereby provide protection for the printed image.

There is also the general mode and the fixed general mode. In the general mode, the length of the label is defined by the image input by the user. In the fixed length mode, the length of the label is defined by the length input by the user.

Other modes include the patch panel mode, the module mode and the terminal block mode. In these modes, various different areas on the same label are defined. The size of these areas may be defined by a user. Finally, there is the vertical mode in which an image is printed with the characters extending along the length of the tape and at 90° with respect to the width of the tape.

Figure 9:
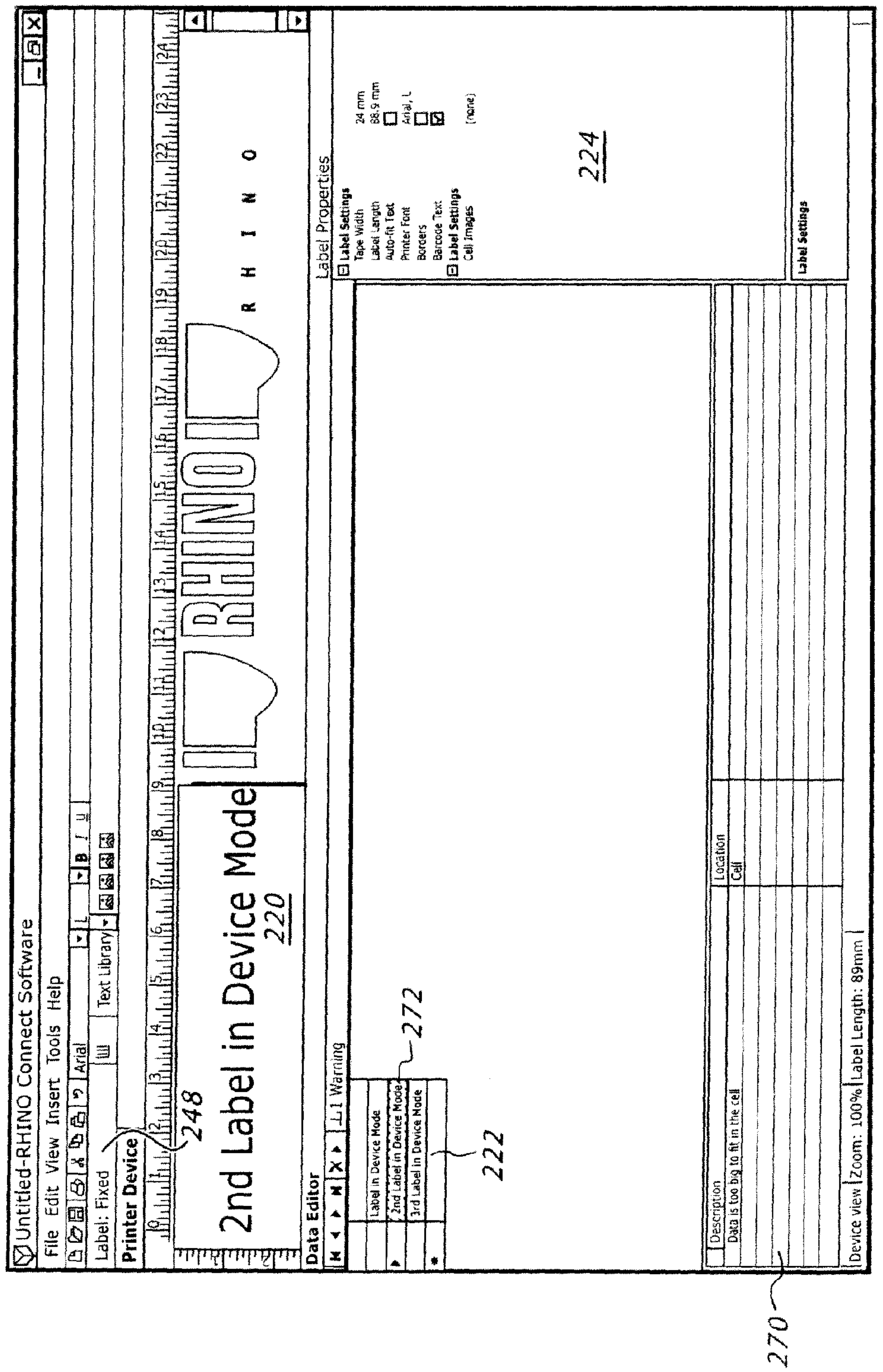
FIG. 9 shows an image displayed on the display of the PC, when there is an error.

Reference is made to FIG. 9 which shows how an error is displayed in one embodiment of the present invention. In the example shown in FIG. 9, the software is in the device mode. However, it should be appreciated that this is also applicable to the printer mode, in some embodiments of the present invention. Below the data editor area 222 is a further area 270. As can be seen from area 248, the label type is a fixed length label. An indicator is provided in the data editor in the cell corresponding to the second label. This is referenced 272. This warning symbol can take any suitable format. An explanation of this error is given in area 270. In particular, it is indicated that the data is too big to fit in a cell. In other words, the input image is larger than the length which is defined for the fixed length label. The area 270 provides information as to the nature of the error and where that error is located. In this example, the location of the error is indicated as being the cell i.e. the second label in the device mode in which the warning symbol appears.

Figure 10:
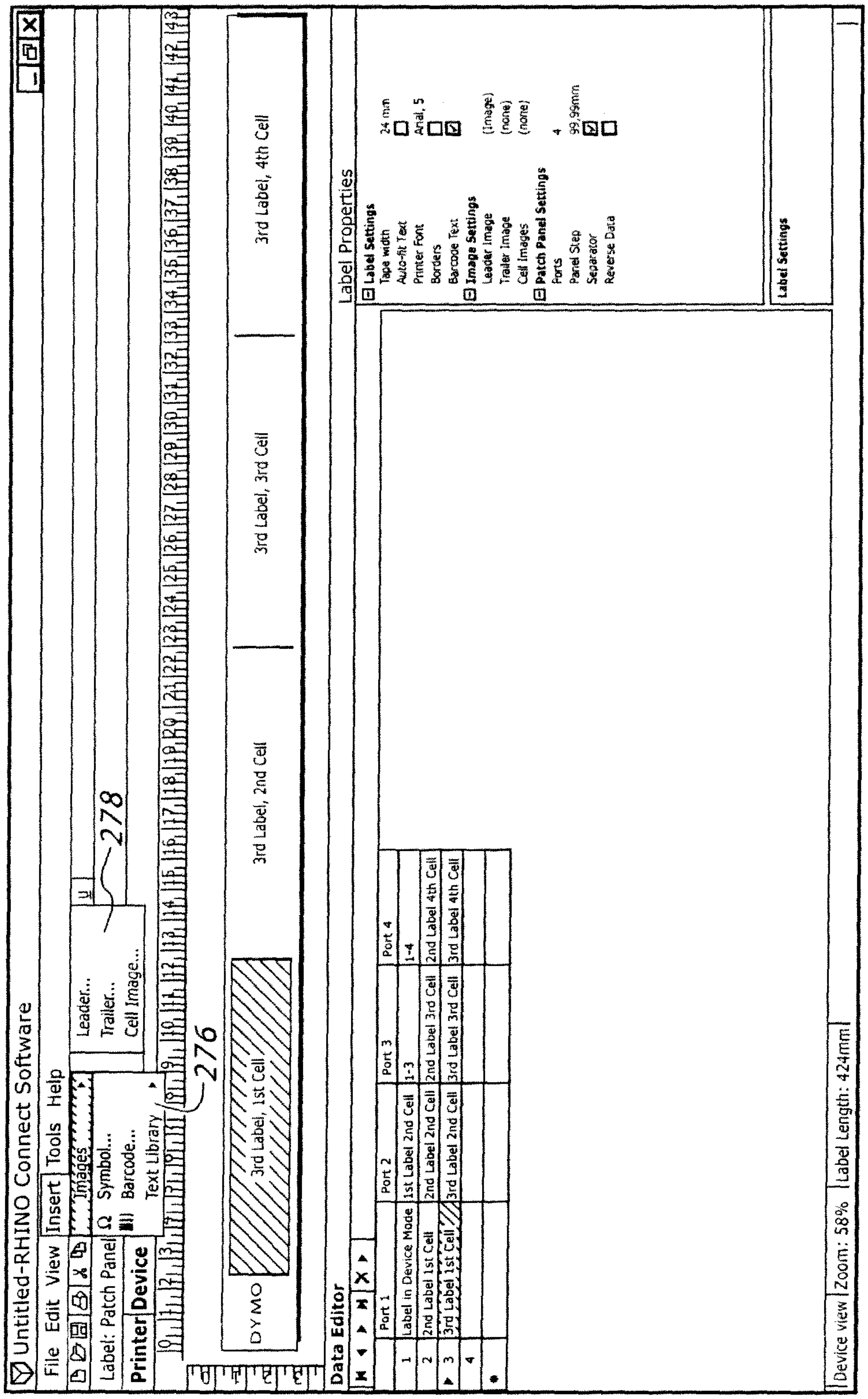
FIG. 10 shows the image displayed by the display of the PC when an image is to be inserted into a label.
Figure 11:
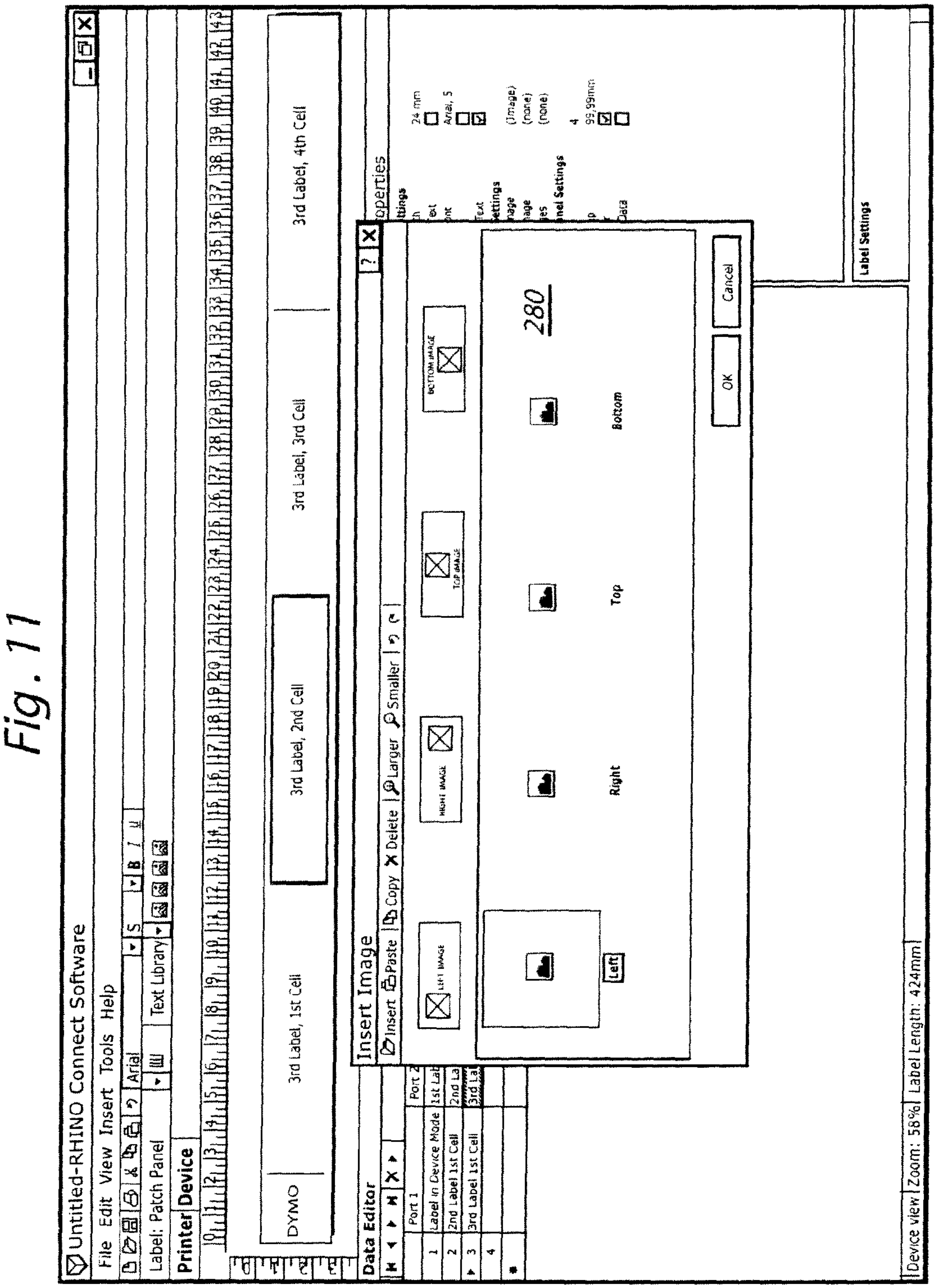
FIG. 11 shows an image displayed by the display of the PC which illustrates where an image can be inserted.

Reference is now made to FIGS. 10 and 11 which illustrate the insertion of objects into the label.

As can be seen from FIG. 10, the user is able to insert an image, a symbol, a barcode or a text string. These are the options displayed in menu 276. It should be appreciated that the text library option contains predefined strings of characters. These may be predefined and/or may be user defined. When the user selects one of these options, the user may be given the option as to where to insert the image. In some embodiments of the present invention, there are two options. The item to be inserted can be inserted at the current location of the cursor in the image being edited. A second option is to allow the user to select the position of the image within the cell from a list of options, for example leader (at the beginning of the label), trailer (at the end of the label), or in the cell. It should be appreciated that in some embodiments of the present invention, only one or other of these options may be available. In some embodiments of the present invention, both of these options may be available for any of the items to be inserted. However, in this embodiment, symbols, barcodes and text strings are inserted at the current location of the cursor.

Thus, as shown in FIG. 10 when the image option is highlighted in the menu 276, a further menu 278 is displayed. This defines three options—leader, trailer and cell image. Leader would put the image into the leading margin of the label. Trailer would put the image into the trailing margin of the label. Selection of the cell image causes the menu shown in FIG. 11 to be displayed. This gives the option of allowing the user to put the image to the left of the label, to the right of the label, to the top of the label or to the bottom of the label.

The synchronisation of the memory in the tape label printing apparatus and that of the PC will now be described with reference to FIGS. 12 and 13.

The tools option, which can be seen in various of the figures including FIGS. 5 and 6 has an option of the transfer files. When this is selected, the display as shown in FIGS. 12 and 13 are displayed. One area 282 of the display will show the labels which are stored in the memory of the PC. The second area 284 will show the labels which are currently stored in the memory of the PC. The user can go through the list of labels which are stored in the PC and highlight one or more of those labels. When the transfer option is selected, this will cause the labels to be downloaded to the memory on the printer.

In one embodiment of the present invention, highlighting the transfer area 286 on the display using a mouse or similar device will actually cause the highlighted labels to be transferred to the memory of the label printing apparatus. In an alternative embodiment of the present invention, highlighting the transfer area will cause those labels which are to be transferred to be listed in the area 284. The user is thus able to select some or all of the labels in the PC to be downloaded to the memory on the label printing apparatus.

In a second embodiment, clicking on the transfer area causes an indication to be displayed in the area 284 corresponding to the tape printing apparatus to be displayed in the. It is only by clicking on the save changes area or similar will this cause the labels to be transferred from the PC to the tape printing apparatus.

It should be appreciated that this operation can be carried out so as to store labels from the memory of the label printing apparatus to that of the PC. This would mean clicking on the transfer area 289 of the screen corresponding to the transfer of labels from the tape printing apparatus to the PC.

Either of the two mechanisms for causing the data to be downloaded from one memory to the other may be used.

It should be appreciated that when the tape printing apparatus is connected to the PC and the transfer files mode is selected, the files which are in the tape printing apparatus are effectively uploaded to the memory of the PC. Accordingly, once a label has been uploaded and amended or is to be downloaded to the memory, the saving changes effectively only downloads the changes to the memory of the tape printing apparatus. Put another way, only the labels which are changed and/or the new labels are downloaded. In the case of the labels which are changed, it is possible in some embodiments of the invention to only download the changes and not all of the label.

Figure 12:
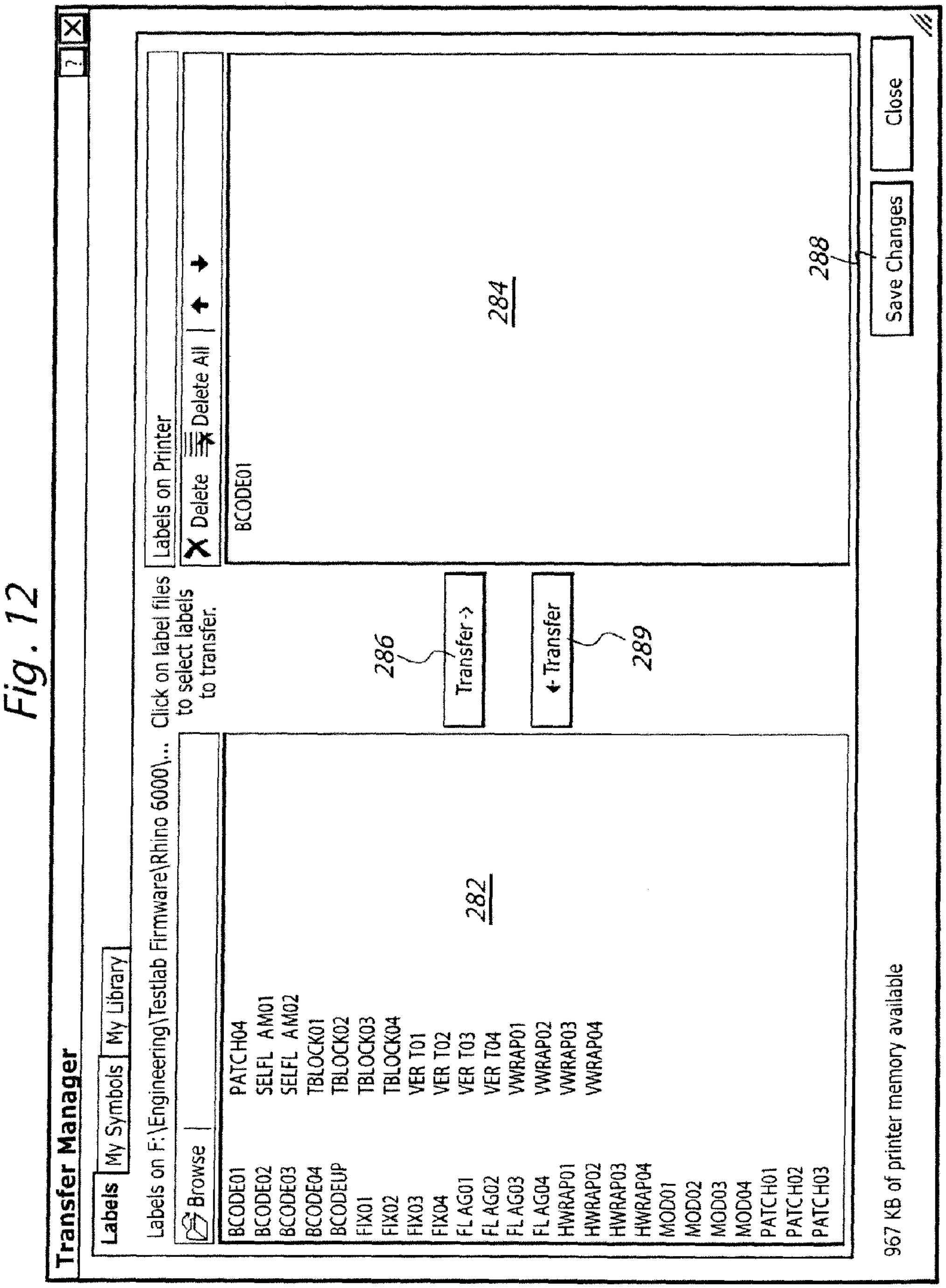
FIG. 12 shows the image on the display of the PC when a label is to be transferred from the PC to the label printer.
Figure 13:
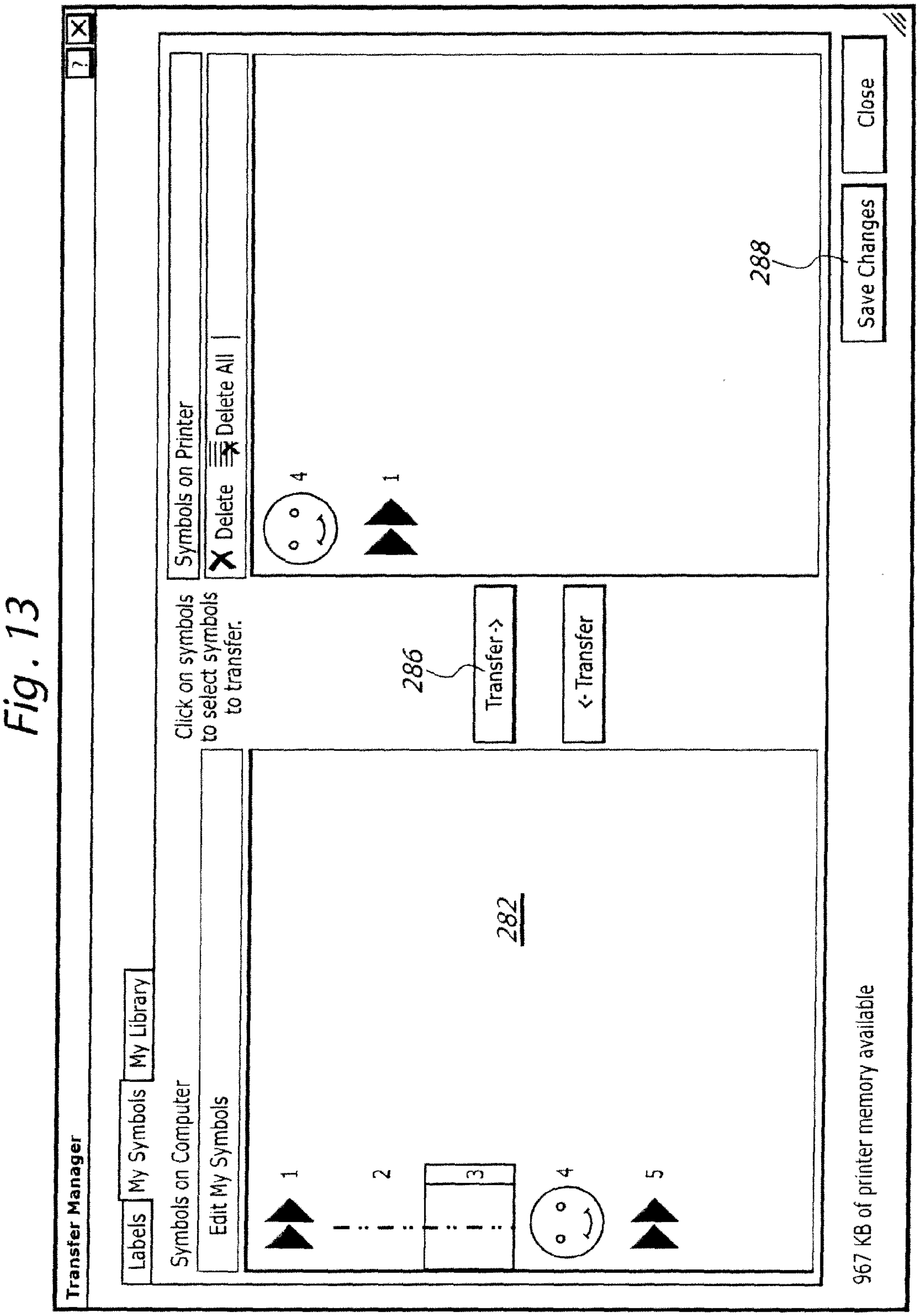
FIG. 13 shows the image displayed by the display of the PC when a symbol is to be transferred from the PC to the tape printing apparatus.

The arrangement shown in FIG. 12 shows the downloading/uploading/synchronising of labels stored on the PC and the label tape printing apparatus. FIG. 13 is similar to FIG. 12 but instead of labels, the same procedure can be carried out in respect of symbols.

My library contains a list of text strings. The same operations as described in relation to the labels and symbols can also be carried out.

The protocol used to transfer data between the PC and the label printer will now be described. The protocol is such that the transfer of data between the PC and the label printer and vice versa can be accomplished relatively quickly. One way of achieving this would be to send a command with every n packets where n is for example 3. The protocol would be to send the command with the n packets, and wait for a reply indicating that the packets have been correctly programmed or stored in the entity receiving the packets. However, the inventors have noticed that the efficiency of the data transfer can be improved.

Reading out the data from the flash memory is done by:

1. Send out a Read command to the printer
2. An Acknowledgement is send back to the PC on correct reception of the command
3. Data is sent on from the printer to the PC with the requested amount of data
4. Checksum command is send to the printer
5. Acknowledgement is send back to the PC on the correct reception of the command
6. Checksum is calculated and send back to the PC In preferred embodiments of the invention, a single command is used to preface the transfer of all the data from the PC to the label printer and vice versa. This command will comprise a unique command, a destination address, the number of bytes or packets and a checksum. This is followed by all the data to be transferred. In this way the command overhead is greatly reduced.

In one embodiment of the invention, the first flash memory storing the labels may be sized as follows:

page size 264 Bytes

Number of pages 4096

Total number of bytes—1081344

Turn around speed 2 ms (this is for USB 1.1)

Thus the time taken to read the entire flash memory in an embodiment of the invention would be around 33 s, if a single command is used for the entire contents of the flash memory. This contrasts with a time of around 82 second where a command and the associated protocol is associated with each page of the memory.

In the case of data transfer from the label printer to the PC, this will consist of all the files stored in the associated flash memory in the label printer. In the case of the data transfer from the PC to the label printer, this will consist of the changes only made to the files stored in the label printer.

One advantage of embodiments of the present invention is that often, labels are downloaded onto the label printer and taken to a local site where they are printed out. Often some changes, sometimes minor changes, need to be made to reflect local conditions or the layout of wiring, buildings, furniture or the like. With previous products, there has been no easy way to keep track of these changes. With embodiments of the invention, the labels are modified and saved in the memory of the label printer. The next time that the labels are uploaded into the PC, the actually used labels will be available to the user of the PC. This is useful where a master record is kept at the PC.

The PC is arranged to validate the labels before they are downloaded to the label printer. In other words the PC makes sure that the label printer is able to print the labels downloaded to it by the PC in terms of the capabilities of the label printer. By having the PC carrying out the validation, the amount of processing capability required in the label printer can be reduced. The PC can look at one or more characteristics including font information, layout information, image information, size information and complexity of the label.

The PC is arranged to have a flag or indicator which indicates if the label printer is operating in the device mode or the printer mode. In one embodiment this is a flag which has one value for the device mode and a different value for the printer mode. This is used to distinguish data which is to be stored in the label printer and the data which is to be printed by the label printer. When the flag or indicator indicates that the label printer is in a printer mode, the data may be sent to the printer in accordance with a proprietary protocol such as Windows spooler protocol. When the flag or indicator indicates that the label printer is in the device mode, the PC is arranged to use one or commands from a library of commands specific to the label printer.

The USB connection between the PC and the label printer is arranged to have two virtual ports. One virtual port is used for communications in the printer mode and the other virtual port is used for communications in the device mode. In this way, depending on which virtual port the label printer is able to determine if the data is to be printed (ie the label printer is operating in the printer mode) or if the data is to be stored (ie the label printer is operating in the device mode).

The printer can also be a composed device, where the printer is registered onto the PC as a printer and a mass storage device. This printer mode would then connect to the printer and the device mode would connect to mass storage device. This way the printer would be installed into the printer folder of the OS operating system and as a new disk.

The data is sent between the PC and the label printer in one or more binary data files.

Figure 14:
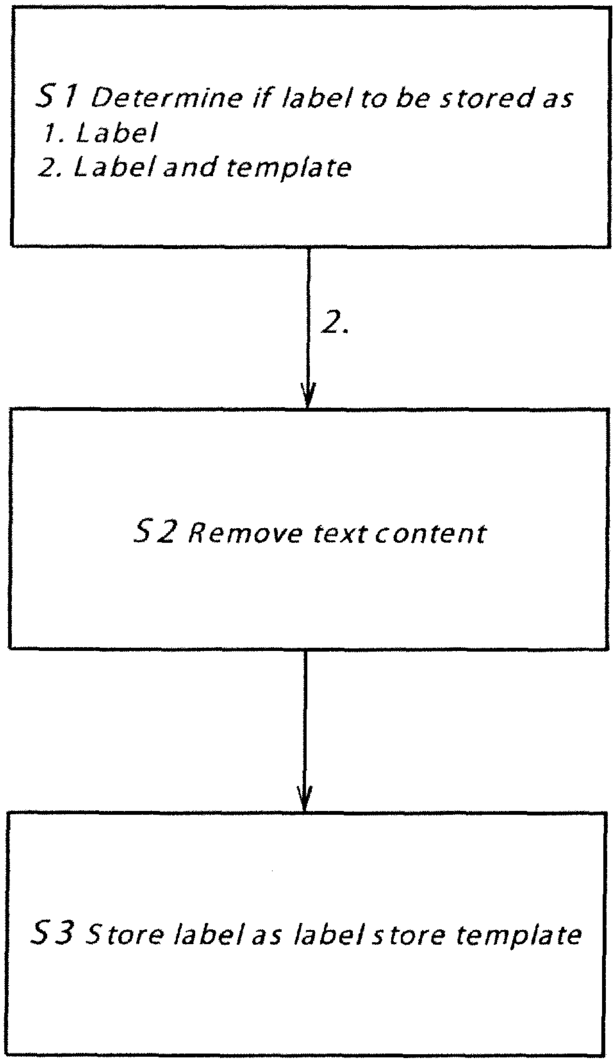
FIG. 14 shows a method for creating a template.

Reference is now made to FIG. 14. FIG. 14 shows a method carried out by the PC. The processor 206 determines in step S1 if a label is to be stored as a label or as a label and a template. In one embodiment of the invention, the processor determines those labels which are to be stored as a template on the basis of the content of the label. In one embodiment of the invention, the processor will determine if the label contains a graphic or a bit map image. If the label does contain a bit map image, then the label will additionally be stored as a template. It should be appreciated that alternative embodiments may look for objects additional to or as an alternative to bit maps when determining if the label is to be stored as a template.

In an alternative embodiment of the invention, the processor will determine if a label is to be stored additionally as a template in dependence on the procedure used to create the label. For example if the user uses the "insert image" menu option, the label is additionally stored as template.

In yet another alternative embodiment of the invention, a label may be additionally stored as a template if an image or predetermined object is located in one or more specific locations in the label.

In yet another embodiment of the invention, the display of the PC may display a question or the like. In dependence on the answer, the label will be saved additionally as a template or not. Alternatively, the user may select an option which will result in the label additionally being stored as a template.

In step S2, the labels which are to be stored as a template have their text content removed. The template will contain label attribute information, that is information relating to the layout of the label and/or the detected bitmap or object.

In step S3, the label as it is entered is stored as a label and the label with the removed information is stored as a template. The labels may be provided with an identifier or flag which indicates if the label is a label or template. Alternatively or additionally, the labels and templates are stored in different memory locations. The different memory locations may provide an indication as to whether the label is a label or a template.

The label and the template will be stored with the same name. However, as discussed above, a mechanism is provided in order to determine which is the label and which is the template.

Embodiments of the present invention have been described in the context of an arrangement in which a cassette containing an ink ribbon and image receiving tape are used. It should be appreciated that alternative embodiments of the present invention may be used with a direct thermal material. This means that the need for the ink ribbon can be omitted. In a still further embodiment of the present invention, a two-cassette system may be used where the ink ribbon is accommodated in one cassette and the image receiving tape is accommodated in a different cassette.

In yet another alternative embodiment of the present invention, the image receiving tape may simply be provided on a roll without any cassette present.

Preferred embodiments of the present invention have been described in the context of a continuous image receiving tape. It should be appreciated that alternative embodiments of the present invention may be used with die cut labels, that is discrete labels which are adhered to a continuous backing layer.

Alternative embodiments of the present invention may use a further laminating tape which is used to protect the printed image. A number of different techniques are known for achieving lamination.

Embodiments of the invention have been described in the context of direct thermal and thermal transfer by way of ink ribbon print technologies. It should be appreciated that embodiments of the invention are not limited to such printing technologies and can be used with any suitable technologies such as laser printing, ink jet printing or any other printing technology.

The invention claimed is:

1. An apparatus comprising:

an input for enabling a user to input label data content for a label;

a processor arranged to determine if said input label data content of said label satisfies a predetermined criteria, said data content comprising data to be printed, and if so to modify said data content of the label to provide a template;

wherein said processor is arranged to remove some of said data content defining said label to provide said template;

and wherein said apparatus is configured to store said input label data content as a label, and to store said provided template as a template.

2. An apparatus as claimed in claim 1, wherein said predetermined criteria comprises at least one of:

the presence of a predetermined object; the presence of a bit map; the presence of an image; the presence of an object, or image at one or more predetermined locations.

3. An apparatus as claimed in claim 1, wherein said some of said data content comprises image information.

4. An apparatus as claimed in claim 1, wherein said apparatus is configured to provide at least one of said stored label and said stored template with an identifier for identification thereof.

5. An apparatus as claimed in claim 1, wherein said apparatus is configured to store said label and said template in different memory locations.

6. An apparatus as claimed in claim 1, wherein said apparatus is configured to store said label and said template with the same name.

7. A method of creating a template comprising:

inputting with an input label data content for a label;

determining with a processor if data content of said label satisfies a predetermined criteria, said data content comprising data to be printed, and if so to modify said data content of said label to provide a template;

wherein said method comprises removing some of said data content defining said label to provide said template;

and storing said input label data content as a label, and storing said provided template as a template.

* * * * *